(12) United States Patent
Gaetje et al.

(10) Patent No.: US 10,038,859 B2
(45) Date of Patent: Jul. 31, 2018

(54) SAME SCREEN, MULTIPLE CONTENT VIEWING METHOD AND APPARATUS

(71) Applicant: OpenTV, Inc., San Francisco, CA (US)

(72) Inventors: Clay E. Gaetje, Fullerton, CA (US); John Tinsman, Fallbrook, CA (US)

(73) Assignee: OPENTV, INC., San Francisco, CA (US)

( * ) Notice: Subject to any disclaimer, the term of this patent is extended or adjusted under 35 U.S.C. 154(b) by 154 days.

(21) Appl. No.: 14/960,221

(22) Filed: Dec. 4, 2015

(65) Prior Publication Data

US 2017/0163900 A1 Jun. 8, 2017

(51) Int. Cl.
| | | |
|---|---|---|
| *G06T 11/60* | (2006.01) | |
| *H04N 5/265* | (2006.01) | |
| *G02C 7/12* | (2006.01) | |
| *H04N 13/04* | (2006.01) | |
| *H04N 5/04* | (2006.01) | |
| *H04N 21/431* | (2011.01) | |
| *H04N 21/44* | (2011.01) | |

(52) U.S. Cl.
CPC .............. *H04N 5/265* (2013.01); *G02C 7/12* (2013.01); *G06T 11/60* (2013.01); *H04N 13/04* (2013.01); *H04N 13/0434* (2013.01); *H04N 5/04* (2013.01); *H04N 21/4316* (2013.01); *H04N 21/44* (2013.01)

(58) Field of Classification Search
CPC .............................. H04N 5/262; G06F 3/1431
See application file for complete search history.

(56) References Cited

U.S. PATENT DOCUMENTS

| 7,948,561 B2 | 5/2011 | Yun et al. |
|---|---|---|
| 2004/0111526 A1 | 6/2004 | Baldwin et al. |
| (Continued) | | |

FOREIGN PATENT DOCUMENTS

WO WO-2017096111 A1 6/2017

OTHER PUBLICATIONS

Denison, Caleb, "Samsung KN55S9C Review", [Online]. Retrieved from the Internet: <http://www.digitaltrends.com/tv-reviews/samsung-kn55s9c-review/>, (Aug. 15, 2013), 11 pgs.

(Continued)

*Primary Examiner* — Phi Hoang
(74) *Attorney, Agent, or Firm* — Schwegman, Lundberg & Woessner, P.A.

(57) ABSTRACT

In example embodiments, a system and method for presenting multiple content (e.g., programs) on a single presentation device to a plurality of viewers is provided. The method comprises causing presentation of a combined video stream on the single presentation device. The combined video stream combines video data for at least a first video content of a first content stream and a second video content of a second content stream. The first video content is viewable by a first viewer and the second video content is viewable a second viewer. A control signal is received from a handheld device of the first viewer that indicates an action to be performed on the first video content. The combined video stream is modified to cause the action to be performed on the first video content. The adjusting of the combined video stream has no effect on the display of the second video content.

20 Claims, 10 Drawing Sheets

(56) References Cited

U.S. PATENT DOCUMENTS

| | | | |
|---|---|---|---|
| 2010/0079585 A1* | 4/2010 | Nemeth | H04N 13/0434 348/54 |
| 2010/0079676 A1* | 4/2010 | Kritt | G06F 3/1431 348/598 |
| 2011/0159959 A1* | 6/2011 | Mallinson | A63F 13/235 463/37 |
| 2012/0026157 A1* | 2/2012 | Unkel | G09G 3/003 345/419 |
| 2012/0050466 A1* | 3/2012 | Okada | H04N 13/0048 348/43 |
| 2013/0074117 A1* | 3/2013 | Song | H04W 4/06 725/31 |
| 2013/0194395 A1 | 8/2013 | Hannuksela et al. | |
| 2014/0020037 A1 | 1/2014 | Hybertson | |
| 2014/0028811 A1* | 1/2014 | Ebersole | H04N 13/04 348/54 |
| 2014/0210695 A1* | 7/2014 | Lin | G09G 3/00 345/32 |
| 2015/0237430 A1* | 8/2015 | Han | H04R 1/028 381/381 |
| 2016/0203796 A1* | 7/2016 | Kapinos | G02B 27/017 345/2.3 |

OTHER PUBLICATIONS

"International Application Serial No. PCT/US2016/064534, International Search Report dated Feb. 7, 2017", 2 pgs.
"International Application Serial No. PCT/US2016/064534, Written Opinion dated Feb. 7, 2017", 7 pgs.

\* cited by examiner

SAME SCREEN, MULTIPLE CONTENT VIEWING METHOD AND APPARATUS

FIELD

The present disclosure relates generally to content presentation, and in a specific example embodiment, to displaying multiple contents (e.g., programs) on a same screen.

BACKGROUND

In an enclosed environment or area, two individuals may desire to view different content from a same presentation device, such as a television, monitor, tablet, smartphone, computer, or mobile device. Conventional systems do not provide an easy means for these individuals to control the viewing of their respective content.

BRIEF DESCRIPTION OF DRAWINGS

Various ones of the appended drawings merely illustrate example embodiments of the present disclosure and cannot be considered as limiting its scope.

DETAILED DESCRIPTION

Figure 1A:
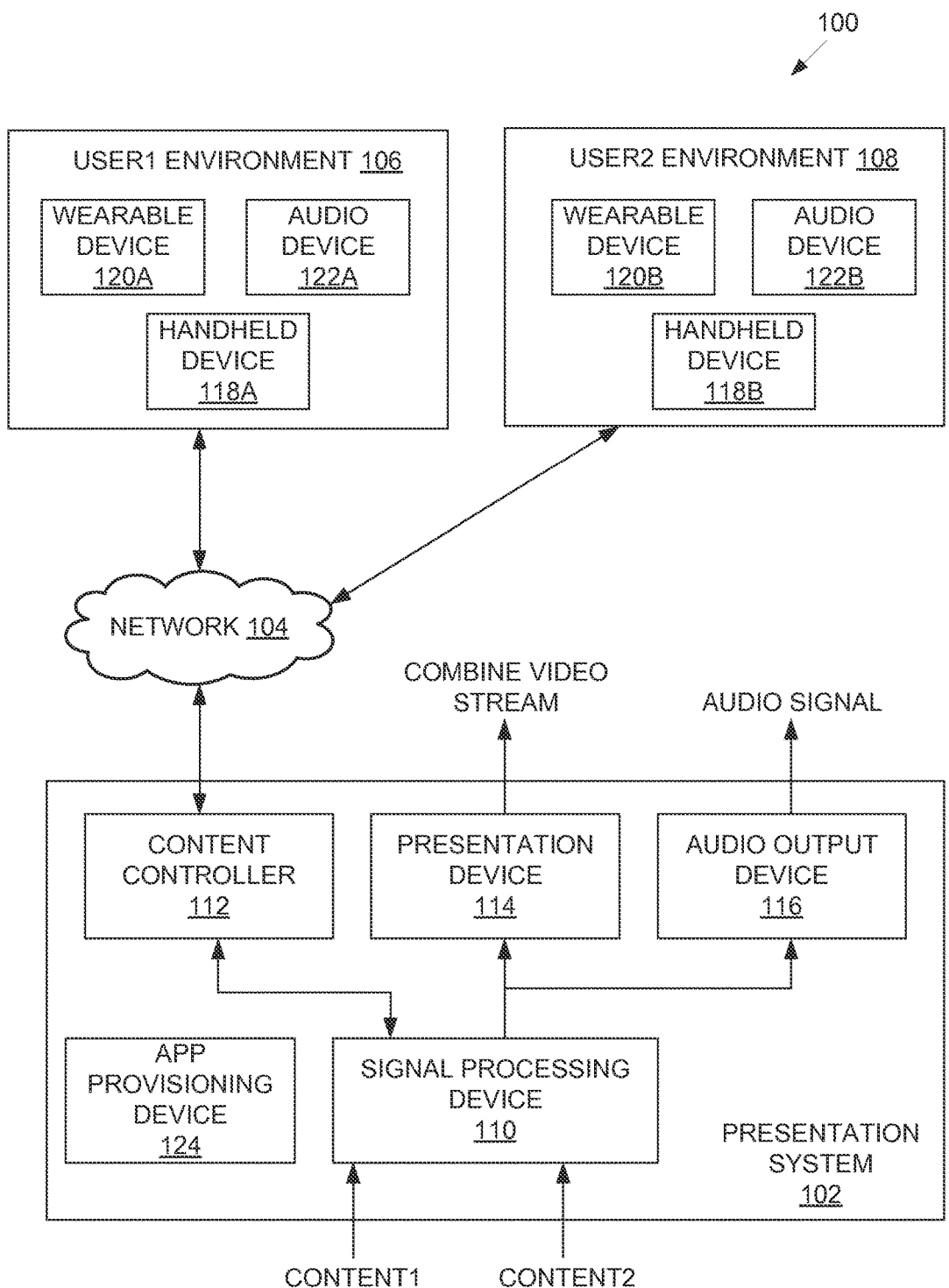
FIG. 1A is a diagram illustrating an example environment in which embodiments of a system may be implemented.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art that embodiments of the inventive subject matter may be practiced without some or all of these specific details. In general, well-known instruction instances, protocols, structures, and techniques have not been shown in detail.

Example embodiments described herein provide systems and methods for presenting multiple programs or content on a same screen of a single presentation device. Accordingly, a combined video stream is caused to be presented on the single presentation device. The combined video stream combines a first video content from a first content stream and a second video content from a second content stream. The first video content is viewable by a first viewer using a first wearable device while the second video content is viewable by a second viewer using a second wearable device. The video content can comprise programs (e.g., television show, movies), a blank presentation, or computing device outputs (e.g., user interfaces from a computing application running on a computing device).

The combined video stream is generated, for example, by using a time-slicing process or a polarization process. In the time-slicing process, frames of each of the first and second video content are sequentially interleaved. If the resulting frequency of the combined video stream is too high for the single presentation device, video data (e.g., frames) for each of the first and second video content are proportionally adjusted prior to interleaving of the frames. In the polarization process, video data (e.g., pixels) of the first video content are interleaved with video data of the second video content onto a frame. The interleaved data is then provided to the presentation device, which polarizes the video data of the first video content in a first direction and polarizes the video data of the second video content in a second direction that is orthogonal to the first direction.

In example embodiments, a control signal is received from a handheld device of one of the viewers (e.g., the first viewer) that indicates an action to be performed on one of the video content (e.g., the first video content) in the combined video stream. The handheld device is specially configured to act as a remote control by activation of an application on the handheld device. The control signal may include an identification of the first video content or an identification of the handheld device that sent the control signal. The combined video stream is adjusted or modified to cause the action to be performed on the first video content based on the control signal. The adjusting of the combined video stream has no effect on the presentation of the second video content in the combined video stream.

As a result, one or more of the methodologies described herein facilitate solving the technical problems related to presenting multiple contents on a same presentation device (e.g., screen). As a result, there is no need to use two different presentation devices in order to present two different content items or programs. As a result, one or more of the methodologies described herein may obviate a need for certain efforts or resources that otherwise would be involved in presenting the content on two or more presentation devices. Additionally, resources used by one or more machines, databases, or devices (e.g., within a network environment) may be reduced. Examples of such computing resources include processor cycles, network traffic, memory usage, data storage capacity, power consumption, network bandwidth, and cooling capacity.

With reference to FIG. 1A, a diagram illustrating an example environment 100 in which embodiments of a system for providing multiple programs or contents on a same screen or presentation device is provided. The environment 100 comprises an area in which multiple viewers are present (e.g., a bedroom, living room, or office). The environment 100 comprises a presentation system 102 coupled via a network 104 (e.g., the Internet, a wireless network, a cellular network, the public switched telephone network (PSTN), a Bluetooth network, an infrared network, or a Wide Area Network (WAN)) to a plurality of user environments (e.g., user1 environment 106 and user2 environment 108). The user1 environment 106 is associated with a first viewer, while the user2 environment 108 is associated with a second viewer. In example embodiments, the first and second viewers each desire to view a different program or content (e.g., content item). In one instance, the first viewer desires to view a program, and the second viewer desires not to view anything (e.g., wants to be presented with a black out screen or blank screen).

The presentation system 102 is configured to receive content streams from various sources and generate a combined video stream that is presented to the first and second viewers. The combined video stream comprises video data (e.g., frames, pixels) from the various sources, and in some embodiments, also includes audio data from the various sources. Accordingly, the presentation system 102 comprises a signal processing device 110, a content controller 112, a presentation device 114, and an audio output device 116. In some embodiments, some components of the presentation system 102 may be embodied within other components. For example, the signal processing device 110, the audio output device 116, the content controller 112, or any components of signal processing device 110 may be a part of the presentation device 114 (e.g., a television). In another example, the content controller 112 may be a part of the signal processing device 110.

The signal processing device 110 is configured to receive multiple content streams and to combine the content streams to generate a combined video stream that contains multiple video content or programs. The combined video stream is then provided to the presentation device 114 (e.g., a television, monitor, tablet, smartphone, computer, mobile device) for video presentation to the viewers. Similarly, a combined audio stream is provided to the audio output device 116 (e.g., speakers, stereo speaker system) for audio presentation to the viewers. The combining may comprise polarization or time slicing video data from the content streams. The signal processing device 110 will be discussed in more detail in connection with FIG. 2 below.

The content controller 112 is configured to receive and process control signals from a handheld device (e.g., handheld device 118A or 118B; collectively referred to as "handheld device 118") at the user environment 106 or 108. The control signal indicates an action to be performed with respect to one of the contents or programs being presented to the viewers. For example, the first viewer at the user1 environment 106 desires to pause program1, and provides an indication of this desire using their handheld device 118A. The content controller 112 receives this indication and causes the signal processing device 110 to adjust or modify the combining of the video content in the content streams such that program1 is paused while program2 being viewed by the second viewer is unaffected (e.g., continues playing for the second viewer). Any operation that can be performed on a program or content may be indicated via the control signal such as, for example, pausing, rewinding, forwarding, stopping, and changing content, or even exiting from viewing the program or content and, for example, viewing a guide or interacting with the user interface. It is noted that program1 and program2 may be the same program. However, because each viewer can control their own viewing experience, the actual presentation of the same program may be different for each viewer.

The handheld device 118 comprises an application that specially configures the handheld device 118 to operate as a control device or remote control for controlling the content or program that the respective viewer is viewing. The application may be downloaded or otherwise obtained from an application provisioning device 124. While the application provisioning device 124 is shown to be within the presentation system 102, alternatively, the application provisioning device 124 may be located outside of the presentation system 102 but accessible via the network 104.

In one embodiment, the audio output device 116 is coupled to the network 104 and provides audio for a specific program to the handheld device 118 of the viewer. For example, audio for program1 is provided via the network 104 to the handheld device 118A of the first viewer, while audio for program2 is provided via the network 104 to the handheld device 118B of the second viewer. The respective viewers can then listen to the audio (e.g., simulcast) through a coupled audio device 122A or 122B (also referred to as audio device 122), such as a headset.

Alternatively, the audio may be provided directly from the audio output device 116 to the audio device 122. For example, the audio output device 116 or the presentation device 114 (e.g., in the case of a television) can wirelessly transmit the audio to the respective audio device 122.

Each user environment 106 and 108 comprises the handheld device 118A or 118, wearable device 120A or 120B (also referred to as wearable device 120), and the audio device 122A or 122B. The handheld device 118 will be discussed in more detail in connection with FIGS. 3 and 4.

The wearable device 120 comprises eyewear or glasses that are similar in application to 3D glasses. In example embodiments, the combined video stream being displayed by the presentation device 114 comprises frames of a first video content of a first content stream and a second video content of a second content stream that are interleaved. Thus, for example, odd-numbered frames of the combined video stream are from program1 and even-numbered frames are from program2. Accordingly, instead of having a left lens and a right lens, as is typical in 3D glasses, the wearable device 120A comprises two "right" lenses, while the wearable device 120B comprises two "left" lenses. The "right" lenses allow viewing, for example, of the odd-numbered frames, while the "left" lenses allow viewing of the even-numbered frames from the combined video stream that is displayed on the presentation device 114 (or vice-versa). This, for example, allows the first viewer with the wearable device 120A to see the odd-numbered frames that represent program1 and not see the even-numbered frames that represent program2. Conversely, the second viewer having the wearable device 120B with two "left" lenses will see the even-numbered frames that represent program2, but not see the odd-numbered frames that represent program1.

Additionally, it is also possible to provide three-dimensional viewing for both viewers. For example, if the output device frame rate is high enough, the presentation device 114 presents a sequence such as, user1-left, user2-left, user-1 right, user-2 right, with the user1 left lens synchronized to an appropriate 1-of-4 frames.

In an alternative embodiment, the combined video stream comprises frames containing pixels polarized in a first direction from program1 and pixels polarized in a second direction from program2, whereby polarization in the second direction is orthogonal to the first direction. For example, the pixels from program1 can be vertically polarized while the pixels from program2 can be horizontally polarized.

Accordingly, the "right" lenses comprises a first direction polarizer (e.g., vertical polarizer) that allows viewing of pixels polarized in the first direction, while the "left" lenses comprises a second direction polarizer (e.g., horizontal polarizer) that allows viewing of pixels polarized in the second direction. This, for example, enables the first viewer with the wearable device 120A to see the vertical polarization that represents program1 and not see the horizontal polarization that represents program2. Conversely, the second viewer having the wearable device 120B with two "left" lenses will see the horizontal polarization that represents program2, but not see the vertical polarization that represents program1.

Alternatively, instead of horizontal and vertical polarization, two different circular polarizations could be used. For example, program1 can be polarized with circular polarization in the clockwise direction, and program2 can be polarized with circular polarization in the counterclockwise direction. Similarly, other shapes can be contemplated for polarization such as, for example elliptical polarization. As long as the "right" and "left" lenses match a direction of their respectively polarized pixels, this would operate similarly to the horizontal and vertical polarization in transmitting or filtering light.

The audio device 122 comprises a headset (e.g., earbuds, headphones). In one embodiment, the audio device 122 receives audio for the content the viewer is watching simulcast via the handheld device 118A. For example, audio for program1 is sent via the network 104 to the handheld device 118 of the first viewer. The audio for program1 is then presented to the first viewer via the audio device 122A (e.g., via a wired or wireless connection between the handheld device 118A and the audio device 122A). Alternatively, the audio may be wireless transmitted from the presentation system 102 directly to the audio device 122. In a further embodiment, the audio device 122A filters out audio for program2 that is being outputted by the audio output device 116 (e.g., speakers) resulting in only audio for program1 being audible to the first viewer. Similar processes can occur for the second viewer using the audio device 122B in the user2 environment 108.

It is noted that the environment 100 shown in FIG. 1 is merely an example. For example, alternative embodiments may comprise any number of user environments 106 and 108. Furthermore, any number of content streams may be received and combined by the signal processing device 110. For example, if the presentation device 114 is capable of handling 240 Hz, then four 60 Hz content streams may be combined together for presentation to up to four viewers.

Figure 1B:
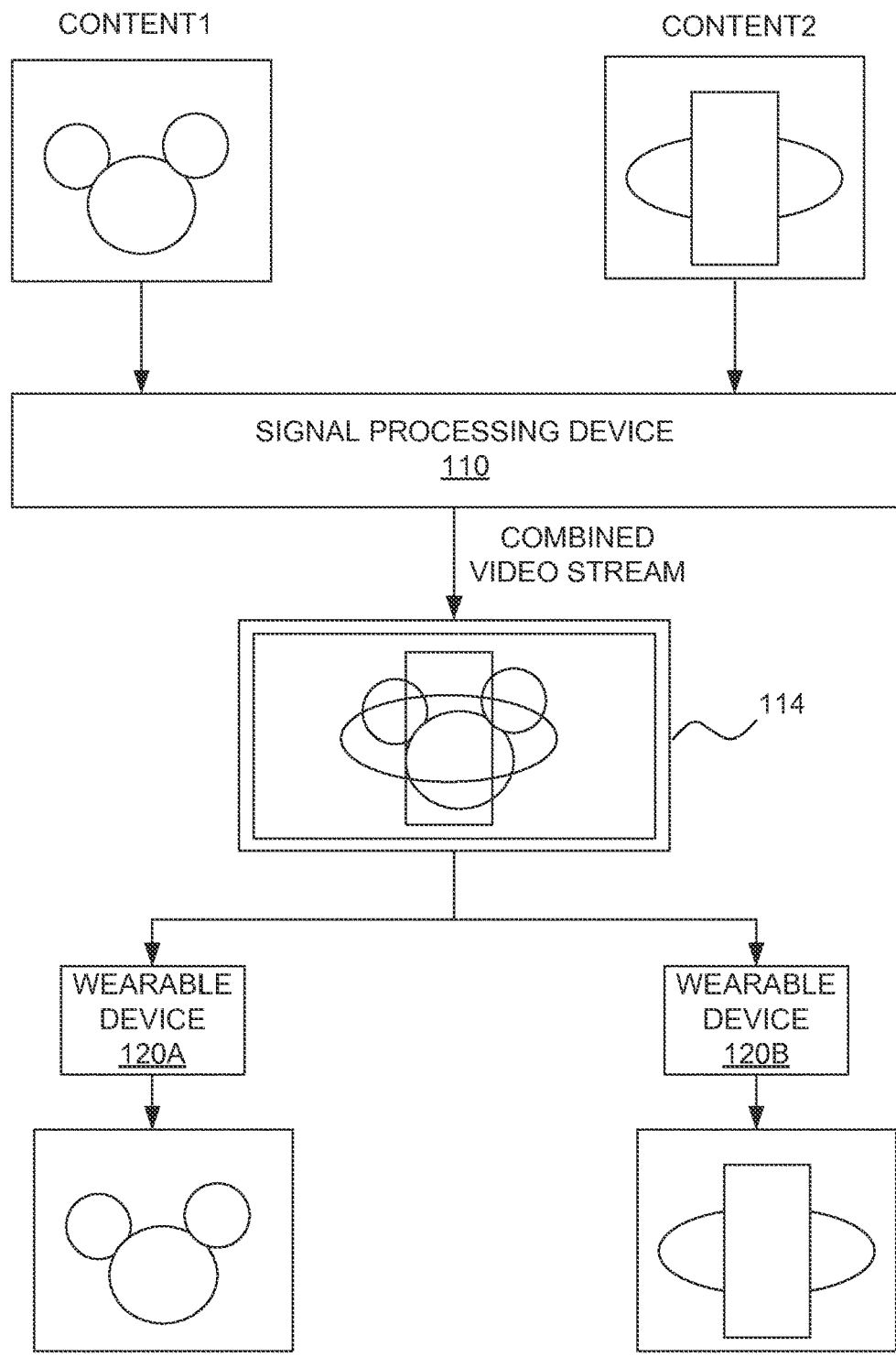
FIG. 1B is depicts a high level illustration of content being combined and presentation and viewing of the combined content.

Referring now to FIG. 1B, a high level illustration of content being combined and presentation and viewing of the combined content is shown. A first content stream (content1) and a second content stream (content2) are received by the signal processing device 110. The signal processing device 110 combines the two content streams such that a single combined video stream is generated. The combined video stream is output through the presentation device 114. When viewed without a wearable device 120, the combined video stream may appear to be gibberish since it is essentially appears as the two video streams superimposed over each other. However, using the wearable device 120, each user is able to filter out the unwanted video stream and only view the desired video stream. For example, the first viewer (user1) wearing wearable device 120A will only see the video stream of content1, while the second viewer (user2) wearing wearable device 120B will only see the video stream of content2.

Figure 2:
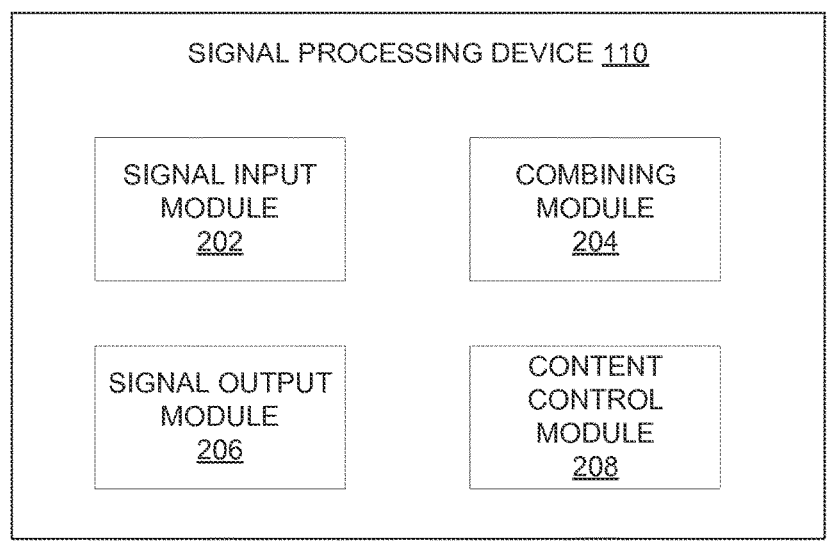
FIG. 2 is a block diagram illustrating an example embodiment of a signal processing device.

FIG. 2 is a block diagram illustrating an example embodiment of the signal processing device 110. The signal processing device 110 is configured to receive multiple content streams each representing a particular piece of video content or a program (e.g., television show, movie, or VOD stream) and to combine the content streams to generate a combined video stream that contains two or more video contents (e.g., program1 and program2). In one embodiment, the video content comprises computer outputs (e.g., user interfaces resulting from an application running on a computer, webpage from the Internet). Thus, for example, a first viewer may watch a program while a second viewer surfs the web. In another example, both viewers may be viewing computer outputs (e.g., user interfaces) for different applications or web pages.

To enable the operations of the signal processing device 110, the signal processing device 110 comprises a signal input module 202, a combining module 204, a signal output module 206, and a content control module 208 all communicatively coupled together (e.g., via a bus). The signal processing device 110 may comprise other components not pertinent to example embodiments that are not shown or discussed. Furthermore, alternative embodiments may comprise more, fewer, multiples of, or other modules, or locate the modules in other components of the presentation system 102. Additionally, some functions of the modules may be combined or divided into two or more further modules.

The signal input module 202 is configured to access or receive the individual content streams from various sources. For example, the sources of the content streams may include broadcast video, cable, satellite, Internet Protocol television (IPTV), over-the-top (OTT) content, DVR recordings, computer display, or any content stream that can be accessed through any standard inputs by, for example, a television display. The content streams are then passed to the combining module 204.

The combining module 204 is configured to generate the combined video stream (or cause the generation of the combined video stream) that is presented to the multiple viewers. In one embodiment, the combining module 204 performs a time slicing operation whereby the combined video stream is a result of interleaving frames from the multiple content streams. In some instances, the combining module 204 first determines whether frames should be adjusted for the individual content streams. For example, the signal processing device 110 may be positioned between a cable box, satellite box, IPTV box, DVR, gateway, or other source and the presentation device 114. In this embodiment, if sources of the content streams are 60 Hz and the presentation device 114 is only capable of handling 60 Hz, then the combining module 204 removes half the frames from each content streams creating two 30 Hz content streams. The two 30 Hz content streams are then interleaved to create a 60 Hz combined video stream. In another example, it is possible that a first source is at 24 frames per second (fps) and the second source is at 60 fps (1080 p), but the presentation device 114 needs 30 fps from each source. In this case, the first source is up-converted, while the second source is down-converted. Once adjusted, the content is interleaved such that a frame from a first content stream (e.g., program1) is caused to be displayed and then a frame from a second content stream (e.g., program2) is caused to be displayed. The frames are displayed at a same pixel count but with double the frame rate (e.g., 120 Hz instead of 60 Hz).

In an embodiment where the combining module 204 is a part of the presentation device 114 (e.g., located within a television), the combining module 204 can take advantage of the presentation device's ability to refresh at a higher rate, such as 120 Hz or 240 Hz. In this embodiment, for example, two different 60 Hz content signals can be input and the combining module 204 combines (or interleaves) the content streams to display a 120 Hz combined video stream.

In an alternative embodiment, the combining module 204 generates the combined video stream, and the presentation device 114 will polarize the pixels a particular way. Accordingly, the combining module 204 interleaves pixel data from the two sources on a same frame such that pixels from program1 will be polarized in a first direction and pixels from program2 will be polarized in a second direction that is orthogonal to the first direction. The presentation device 114 then polarizes the pixels from one content stream (e.g., program1) in the first direction and polarizes pixels from a second content stream (e.g., program2) in the second direction that is orthogonal to the first direction. If the combining module 204 is located external to the presentation device, the combining module 204 time synchronizes the delivery of the content streams to the presentation device 114, which subsequently polarizes the content streams prior to display.

In one embodiment, one of the contents or programs (e.g., program2) causes presentation of a blank screen (also referred to as a black out screen). Accordingly, the combining module 204 combines a blank screen as the content. For example, every even frame in a time-sliced combined video stream is blank. In another example, the horizontally polarized pixels represent the blank screen.

The signal output module 206 is configured to provide the combined video stream along with corresponding audio signals (e.g., either individually or combined) for presentation. Thus, the signal output module 206 provides the combined video stream to the presentation device 114 for visual presentation to the viewers. With respect to the audio signals, in one embodiment, the signal output module 206 provides the audio signals to the audio output device 116 (e.g., speakers), which in turn plays the audio signals simultaneously. In an alternative embodiment, the signal output module 206 or the audio output device 116 provides the audio signals individual to each handheld device 118 or audio device 122 at each respective user environment 106 and 108—either directly (e.g., wirelessly via a transmitter) or via the content controller 112.

The content control module 208 is configured to work with the content controller 112 to cause actions to occur with respect to the combined video stream. For example, the first viewer at the user1 environment 106 desires to change program1 to a program3 and provides an indication of this desire using their handheld device 118A. The content controller 112 receives this indication (via a control signal) and provides this indication to the content control module 208. The content control module 208 then provides instructions to, or otherwise causes, the combining module 204 to adjust or modify the combined video stream such that program1 is replaced with program 3 for the first viewer, while program2 being viewed by the second viewer is unaffected (e.g., continues playing for the second viewer). Similar operations may be performed for other actions to be performed to the program such as pause, rewind, forward, and stop, or exiting the program to interact with the user interface. In some embodiments, the functionality of the content control module 208 may be incorporated into the combining module 204.

Figure 3:
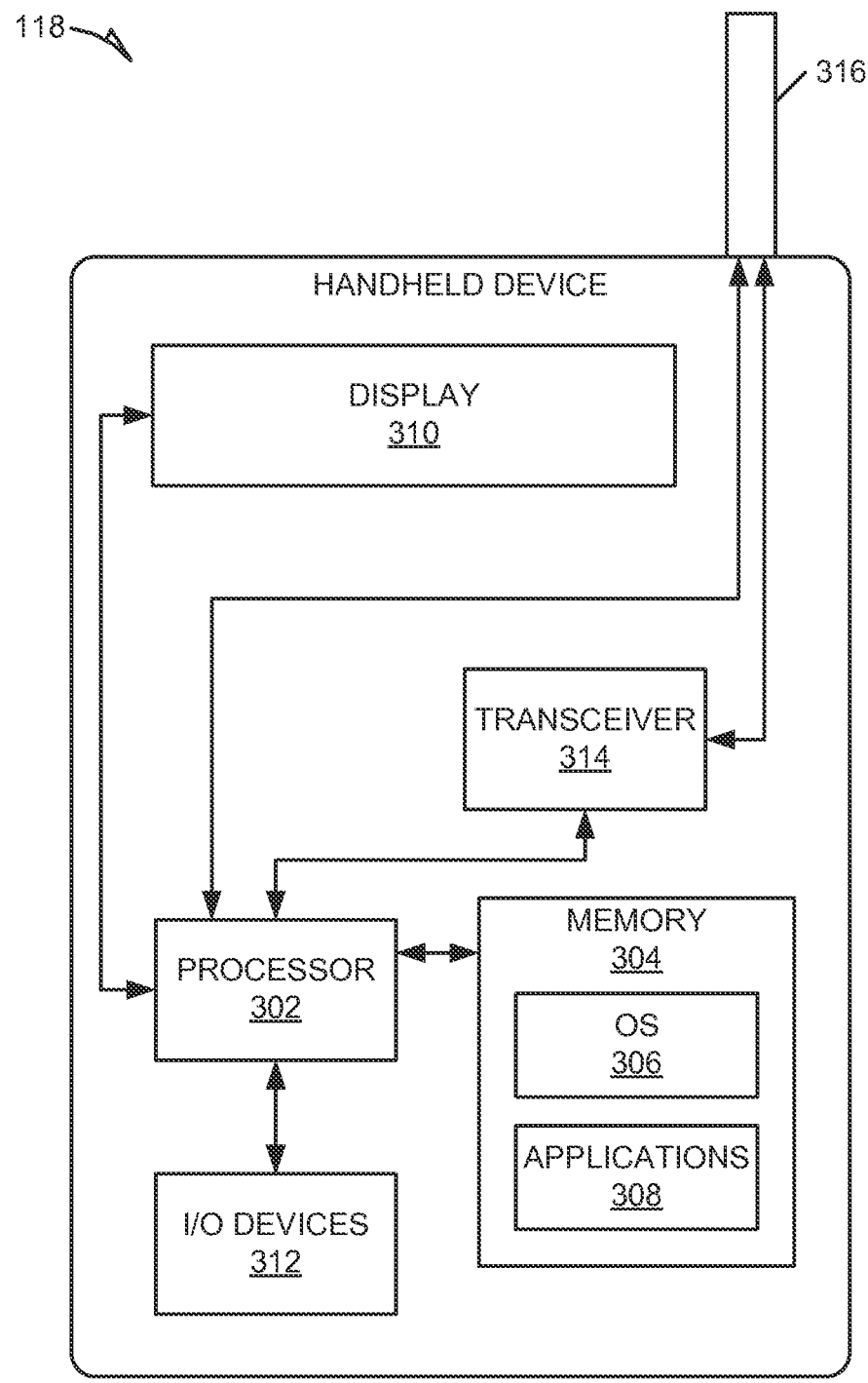
FIG. 3 is a block diagram illustrating an example embodiment of a handheld device.

Referring now to FIG. 3, a detailed block diagram illustrating an example embodiment of the handheld device 118 is shown. The handheld device 118 may comprise a mobile device such as, for example, a mobile phone, a tablet, or a remote control. The handheld device 118 includes a processor 302. The processor 302 may be any of a variety of different types of commercially available processors suitable for mobile devices (e.g., an XScale architecture microprocessor, a Microprocessor without Interlocked Pipeline Stages (MIPS) architecture processor, or another type of processor). A memory 304, such as a Random Access Memory (RAM), a flash memory, or another type of memory, is typically accessible to the processor 302. The memory 304 is adapted to store an operating system (OS) 306, as well as applications 308, such as a content application that allows the viewer using the handheld device 118 to control the program or content the viewer is viewing. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 is configured to both transmit and receive network signals, wireless data signals, or other types of signals via the antenna 316 or other sensors (e.g., infrared sensor) available on the handheld device 118, depending on the nature of the handheld device 118.

In example embodiments, the handheld device 118 is registered with or otherwise known to the presentation system 102. For example, the handheld device 118 may be registered with the content controller 112 or the signal processing device 110. Based on the registration, the presentation system 102 knows which program or content is being presented to each of the user environments 106 or 108. As a result, for example, appropriate audio signals for the program being viewed by the corresponding viewer can be provided to the handheld device 118 and played through the audio device 122. In another example, control signals received from the handheld device 118 can indicate the content being viewed by the corresponding viewer.

Figure 4:
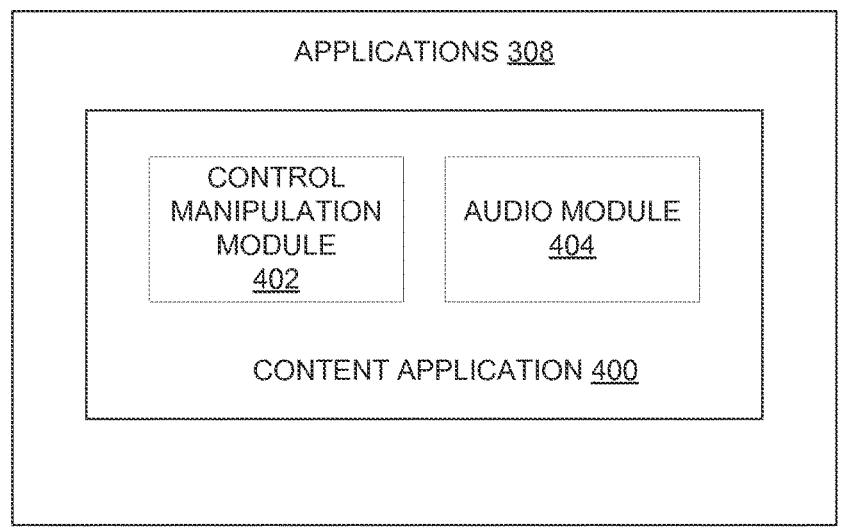
FIG. 4 is a block diagram illustrating an example embodiment of a content application.

Referring now to FIG. 4, a content application 400 of the applications 308 stored in the memory 304 of the handheld device 118 is shown. In example embodiments, the content application 400 is provided (e.g., downloaded) from the application provisioning device 124. The content application 400 enables the viewer using the handheld device 118 to control the program or content the viewer is viewing using the handheld device 118. Accordingly, the content application 400 comprises a control manipulation module 402 and an audio module 404.

The control manipulation module 402 is configured to control presentation of the content using the handheld device 118. Using the control manipulation module 402, the viewer can select content to view; pause, rewind, forward, or stop the content; change content; and perform any other actions that affect the program or content the viewer is viewing. In one embodiment, the control manipulation module 402 causes presentation of a user interface through which the viewer provides a command that affects the content. The control manipulation module 402 then generates a control signal that is transmitted (e.g., via the transceiver 314 and antenna 316) to the content controller 112.

The audio module 404 is configured to receive audio signals from the presentation system 102. In one embodiment, the audio signal comprises an audio track for the content being viewed by the viewer. The audio track can be output to the viewer via the audio device 122. In an alternative embodiment, the audio signal received by the audio module 404 provides an indication of an audio track for the content that the viewer is not viewing. This audio signal is then used to filter out (e.g., by way of the audio device 122) the audio track for the content that the viewer is not viewing that is presented as a combined audio signal from the audio output device 116.

Figure 5:
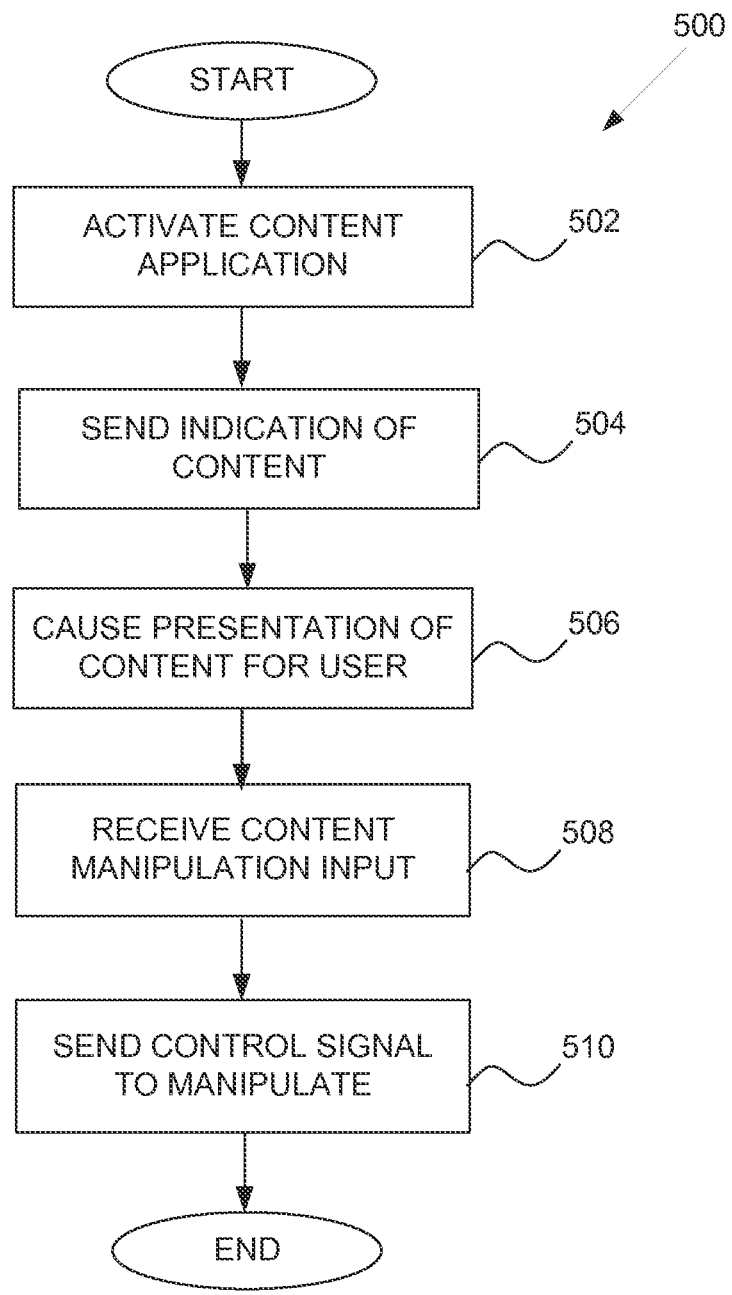
FIG. 5 is a flow diagram of an example method for controlling content at the handheld device.

FIG. 5 is a flow diagram of an example method 500 for controlling content using the handheld device 118. The method 500 may be embodied in computer-readable instructions for execution by one or more processors such that the operations of the method 500 may be performed in part or in whole by the handheld device 118 and the presentation system 102. Accordingly, the method 500 is described by way of example with reference to the handheld device 118 and the presentation system 102. However, it shall be appreciated that at least some of the operations of the method 500 may be deployed on various other hardware configurations, and the method 500 is not intended to be limited to the handheld device 118 and the presentation system 102.

In operation 502, the content application 402 is activated at the handheld device 118. Activation of the content application 402 enables the viewer to control presentation of content (also referred to as a program). In one embodiment, the activated content application 402 causes a user interface to be presented to the viewer through which the viewer provides inputs to control presentation of the content.

In operations 504, an indication of a selection of video content that the viewer wants to view is transmitted. Initially, the viewer selects video content to view using the user interface. Based on the selection, a control signal is generated by the control manipulation module 402 and sent to the content controller 112 at the presentation system 102.

In operation 506, the selected video content is caused to be presented to the viewer. In example embodiments, the content controller 112 receives the control signal and instructs the signal processing device 110 to obtain a content stream for the selected video content and to combine the content stream for the viewer with a content stream for a second video content that is or will be presented to a second viewer. The combined video stream is then presented through the presentation device 114.

In operation 508, a content manipulation input is received. Accordingly, the viewer provides an indication (e.g., on the user interface) to manipulate the content that is being presented to the viewer. For example, the viewer may want to pause the content. The manipulation input is received by the control manipulation module 402.

In operation 510, a control signal corresponding to the manipulation input is transmitted. The control signal is generated by the control manipulation module 402 and indicates the manipulation (e.g., pause the content) to be performed with respect to the content. The control signal is then sent to the content controller 112 at the presentation system 102.

Figure 6:
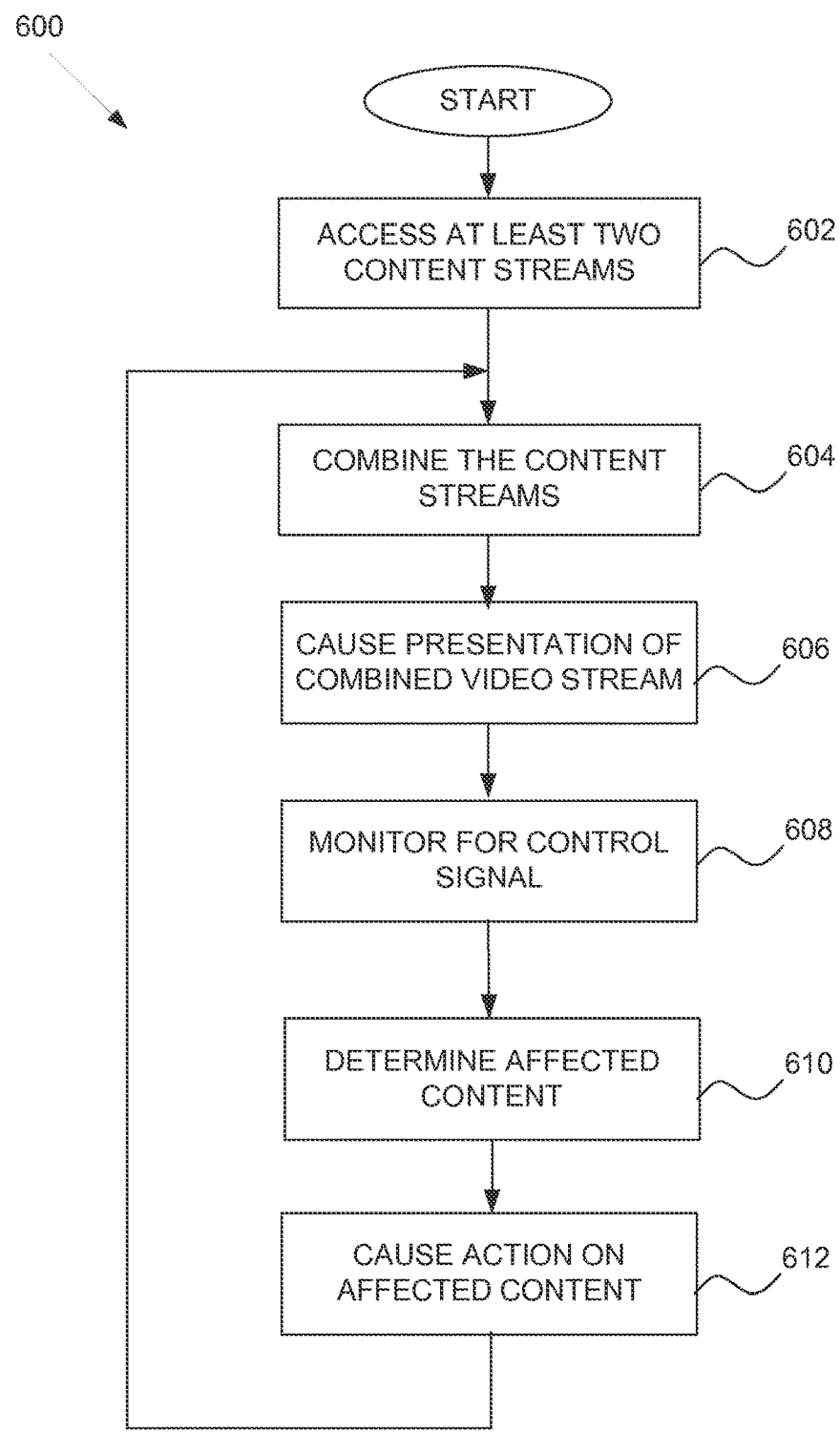
FIG. 6 is a flow diagram of an example method for presenting multiple content on a same screen.

FIG. 6 is a flow diagram of an example method 600 for presenting multiple content on a same screen (e.g., same presentation device 114). The method 600 may be embodied in computer-readable instructions for execution by one or more processors such that the operations of the method 600 may be performed in part or in whole by the presentation system 102. Accordingly, the method 600 is described by way of example with reference to the presentation system 102. However, it shall be appreciated that at least some of the operations of the method 600 may be deployed on various other hardware configurations and the method 600 is not intended to be limited to the presentation system 102.

In operation 602, at least two content streams are accessed by the signal processing device 110. The content streams represent programs or video content that each individual viewer of a plurality of viewers has selected for viewing (e.g., via their handheld device 118). The content streams may be received from sources such as, for example, broadcast video, cable, satellite, Internet Protocol television (IPTV), over-the-top content (OTT), and DVR recordings.

In operation 604, the content streams are combined or interleaved (or caused to be combined) into a combined video stream. In example embodiments, the signal processing device 110 performs either a time slicing interleaving operation or a polarization operation to generate the combined video signal. These two operations will be discussed in more detail in connection with FIGS. 7 and 8.

In operation 606, the contents are presented to the viewers. Accordingly, the signal processing device 110 provides the combined video stream to the presentation device 114. The presentation device 114 then causes a display of the combined video stream. To an individual not wearing the wearable device 120, the images presented by the presentation device 114 appear to be gibberish. However, viewers that are wearing the wearable devices 120 will be able to view their respective content or program.

In operation 608, the content controller 112 monitors for a control signal from one of the viewers. In example embodiments, the control signal is generated and sent by the handheld device 118 and represents an action that the viewer wants to perform with respect to the video content the viewer is viewing. For example, the viewer may want to pause, stop, rewind, or fast forward the video content or program.

When a control signal is received, the affected program or content is determined in operation 610. For example, the control signal may include an identification of the program that is affected. Alternatively, the control signal may include an identification of the handheld device 118 that sent the control signal. Since the original selection of the program came from the same handheld device 118, the content controller 112 can determine the program that is affected from the identification of the handheld device 118.

In operation 612, the action indicated in the control signal is caused to be performed on the video content. In example embodiments, the content controller 112 sends instructions to the signal processing device 110 to perform the action. For example, the content controller 112 may instruct the signal processing device 110 to pause a program1 being presented to a first viewer. As such, the signal processing device 110 modifies the combining of the content streams in such a manner that causes the presentation of program1 to appear paused while leaving a program2 unaffected (e.g., program2 is still playing for a second viewer).

Figure 7:
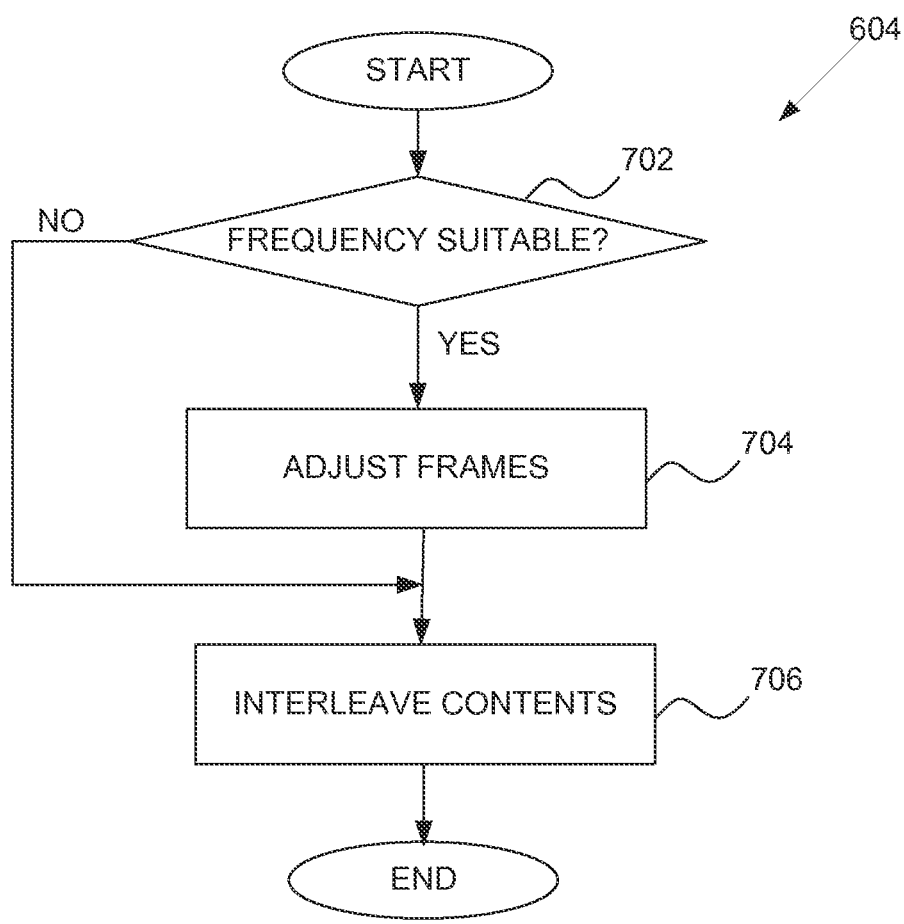
FIG. 7 is a flow diagram of an example method for generating a time-sliced combined video stream.

FIG. 7 is a flow diagram of a method 604 for generating a combined video stream. In the method 604 of FIG. 7, the combined video stream is a time-sliced combined video stream consistent with some embodiments. The method 604 may be embodied in computer-readable instructions for execution by one or more processors such that the operations of the method 604 may be performed in part or in whole by the signal processing device 110. Accordingly, the method 604 is described by way of example with reference to the signal processing device 110. However, it shall be appreciated that at least some of the operations of the method 604 may be deployed on various other hardware configurations and the method 604 is not intended to be limited to the signal processing device 110.

In operation 702, a determination is made as to whether a combined frequency of the combined video stream is suitable for the presentation device 114. For example, assume that the presentation device 114 is capable of handling 120 Hz (or 120 fps). If the first content stream is at 50 Hz (or 50 fps) and the second content stream is at 90 Hz (or 90 fps), then the combined content stream is unsuitable since it would exceed the capability of the presentation device 114.

Based on determination that the resulting frequency is not suitable, the combining module 204 adjusts the frame rates from each content stream to a suitable frame rate (e.g., half of the frame rate of the presentation device 114) in operation 704. There are a variety of methods for frame rate conversion or adjustment, such as frame dropping, frame repeating, or more sophisticated methods involving frame interpolation. In example embodiments, the content source can be requested to provide the right frame rate, or some internal signal processing may be used. One skilled in the art would be aware of general methods for frame rate and picture size conversion. Continuing with the example, the first content stream is up-converted from 50 Hz (or 50 fps) to 60 Hz (or 60 fps) while the second content stream is down-converted from 90 Hz to 60 Hz.

In operation 706, video data (e.g., frames) from the content streams are interleaved. For example, frames from the two 60 Hz content streams are interleaved to create a 120 Hz combined video stream. In one embodiment, the interleaving results in a frame from a first content stream (e.g., program1) being displayed followed by a frame from a second content stream (e.g., program2) being displayed. As a result, frames from the first content streams comprise the odd frames, while frames from the second stream source comprise the even frames. The frames are displayed at a same pixel count but with double the frame rate.

Figure 8:
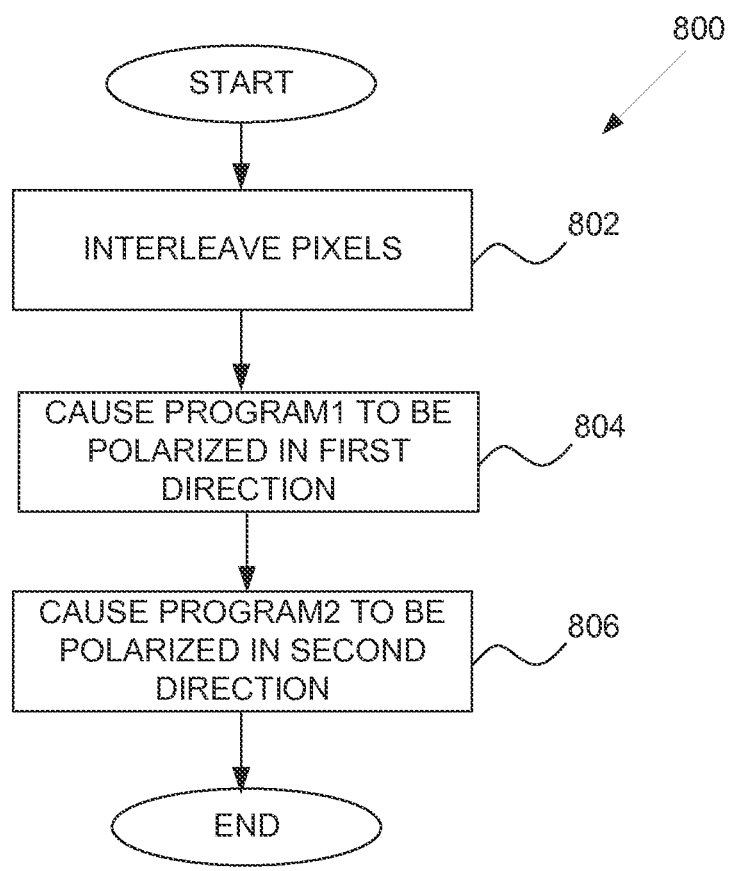
FIG. 8 is a flow diagram of an example method for generating a polarized combined video stream.

FIG. 8 is a flow diagram of an alternative example method 800 (operations 604 and 606) whereby the combined video stream is generated and polarized for display. The method 800 may be embodied in computer-readable instructions for execution by one or more processors such that the operations of the method 800 may be performed in part or in whole by the signal processing device 110 or the presentation device 114. Accordingly, the method 800 is described by way of example with reference to the signal processing device 110 or the presentation device 114. However, it shall be appreciated that at least some of the operations of the method 800 may be deployed on various other hardware configurations and the method 800 is not intended to be limited to the signal processing device 110 and the presentation device 114.

In operation 802, the signal processing device 110 combines pixel data from two sources. For example, the combining module 204 interleaves pixel data from two sources on a same frame such that pixels from program1 will be polarized in a first direction and pixels from program2 will be polarized in a second direction that is orthogonal to the first direction.

In operation 804, the presentation device 114 causes the pixels of program1 to be polarized in a first direction when displayed. For example, the pixels in program1 may be polarized horizontally or circularly polarized in a clockwise direction. Similarly, in operation 806, pixels of program2 are caused to be polarized in a second direction. For example, the pixels in program2 may be polarized vertically or circularly polarized in a counterclockwise direction. If more than two programs are being combined, the polarization may be at different angles. As such, the interleaved content is sent to the presentation device 114 in a time synchronized manner, with instructions for the presentation device 114 to polarize the pixels of program1 in a first direction and the pixels of program2 in a second direction that is orthogonal to the first direction.

While various embodiments and scenarios have been described in the flow diagrams of FIG. 5-8, these embodiments and scenarios are merely examples and embodiments of the present disclosure are not limited to just these. For example, the various operations of the example embodiments may be practiced in a different order or by different devices in the environment 100.

Figure 9:
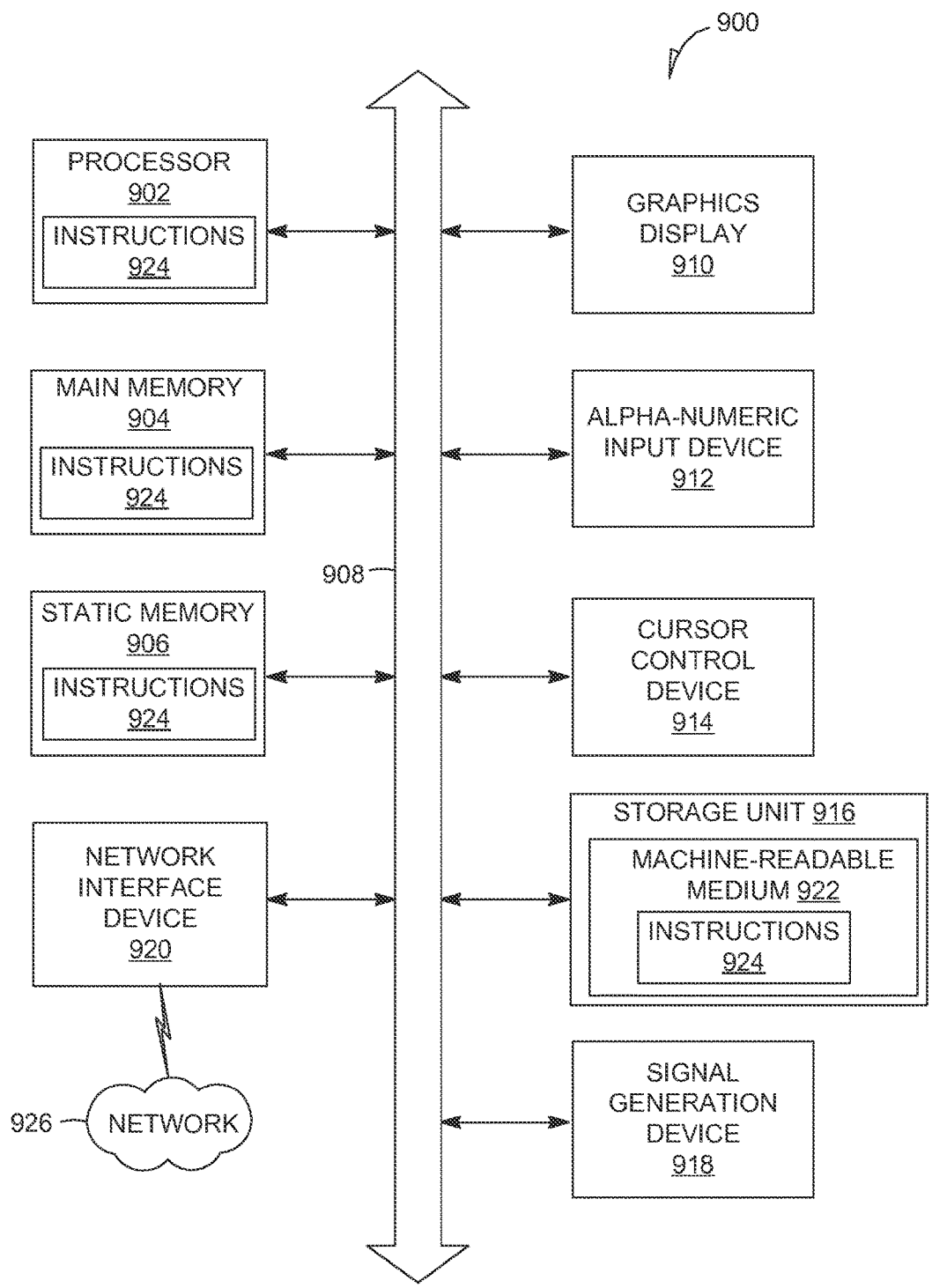
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. The machine 900 may be a server computer, a client computer, a personal computer (PC), a tablet computer, a laptop computer, a netbook, a set-top box (STB), a personal digital assistant (FDA), a cellular telephone, a smart phone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-readable medium 922 (e.g., a tangible machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media 922 (e.g., tangible and non-transitory machine-readable media).

In some example embodiments, the machine 900 may be a portable computing device, such as a smart phone or tablet computer, and have one or more additional input components (e.g., sensors or gauges). Examples of such input components include an image input component (e.g., one or more cameras), an audio input component (e.g., microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium 922 is non-transitory in that it does not embody a propagating signal. However, labeling the tangible machine-readable medium 922 as "non-transitory" should not be construed to mean that the medium is incapable of movement—the medium should be considered as being transportable from one physical location to another. Additionally, since the machine-readable medium 922 is tangible, the medium may be considered to be a machine-readable device. Furthermore, the machine-readable medium does not comprise any transitory signals.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

combining first video content of a first content stream with second video content of a second content stream to generate third video content for a third content stream, the combining comprising interleaving one or more first frames of the first video content with one or more second frames of the second video content to generate the third video content for the third content stream, the first content stream having a first frequency and the second content stream having a second frequency;

determining whether a third frequency of the third content stream does not satisfy a frequency capability of a presentation device;

based on determining that the third frequency of the third content stream does not satisfy the frequency capability of the presentation device, adjusting the third frequency by adjusting at least one of the first frequency of the first content stream or the second frequency of the second content stream such that an adjusted third frequency of the third content stream satisfies the frequency capability of the presentation device;

causing a presentation of the third video content of the third content stream at the presentation device, wherein during the presentation of the third video content, the first video content is viewable to a first user using a first wearable device while the second video content is imperceptible to the first user using the first wearable device and the second video content is viewable to a second user using a second wearable device while the first video content is imperceptible to the second user using the second wearable device;

during the presentation of the third video content, receiving a control signal from a device associated with the first user, the control signal indicating an action to be performed on the first video content; and modifying, by one or more hardware processors, the third content stream to cause the action to be performed on the first video content without affecting the display of the second video content.

2. The method of claim 1, wherein the second video content comprises a black out screen that causes the second user to view a blank presentation.

3. The method of claim 1,
wherein the combining the first video content with the second video content to generate the third video content comprises sequentially interleaving frames from the first video content and the second video content.

4. The method of claim 1,
wherein the adjusting at least one of the first frequency of the first content stream or the second frequency of the second content stream, comprises proportionally adjusting the first frequency of the first content stream and the second frequency of the second content stream such that an adjusted first frequency of the first content stream and an adjusted second frequency of the second content stream are the same.

5. The method of claim 1, wherein the combining the first video content and the second video content to generate the third video content comprises:
   interleaving pixels of the first video content and pixels of the second video content;
   causing the pixels of the first video content to be polarized in a first direction; and
   causing the pixels of the second video content to be polarized in a second direction that is orthogonally different from the first direction.

6. The method of claim 1, further comprising determining that the control signal is to control the action to be performed on the first video content, the determining including detecting an indication of at least one of an identification of the first video content or identification of the device that sent the control signal from the control signal.

7. The method of claim 1, further comprising providing an application to the device, the application specially configuring the device to generate the control signal.

8. A system comprising:
   one or more hardware processors; and
   a memory storing instructions that, when executed by the one or more hardware processors, causes the one or more hardware processors to perform operations comprising:
      combining first video content of a first content stream with second video content of a second content stream to generate third video content for a third video stream, the combining comprising interleaving one or more first frames of the first video content with one or more second frames of the second video content to generate the third video content, the first content stream having a first frequency and the second content stream having a second frequency;
      determining whether a third frequency of the third content stream does not satisfy a frequency capability of a presentation device;
      based on determining that the third frequency of the third content stream does not satisfy the frequency capability of the presentation device, adjusting the third frequency by adjusting at least one of the first frequency of the first content stream or the second frequency of the second content stream such that an adjusted third frequency of the third content stream satisfies the frequency capability of the presentation device;
      causing a presentation of the third video content of the third content stream at the presentation device, wherein during the presentation of the third video content, the first video content is viewable to a first user using a first wearable device while the second video content is imperceptible to the first user using the first wearable device and the second video content is viewable to a second user using a second wearable device while the first video content is imperceptible to the second user using the second wearable device;
      during the presentation of the third video content, receiving a control signal from a device associated with the first user, the control signal indicating an action to be performed on the first video content; and
      modifying the third content stream to cause the action to be performed on the first video content without affecting the display of the second video content.

9. The system of claim 8, wherein the second video content comprises a black out screen.

10. The system of claim 8, wherein at least one of the first video content or the second video content comprises video data from a computing device, the video data representing a user interface being output from the computing device.

11. The system of claim 8, wherein the combining the first video content and the second video content comprises
   sequentially interleaving frames from the first video content and the second video content.

12. The system of claim 8, wherein the combining the first video content and the second video content comprises interleaving pixels of the first video content and pixels of the second video content such that the pixels of the first video content will be polarized in a first direction and the pixels of the second video content will be polarized in a second direction that is orthogonally different from the first direction.

13. The system of claim 8, further comprising the first wearable device, the first wearable device including lenses that cause only the first video content of the third content stream to be visible to the first viewer.

14. The system of claim 13, wherein the lenses comprises two sets of orthogonally polarized lenses.

15. The system of claim 8, wherein the device used to control the presentation of the first video content comprises a smart phone or tablet of the first user that is specially configured by the application.

16. A system comprising:
   means for combining first video content of a first content stream with second video content of a second content stream to generate third video content for a third content stream, the means for combining interleaving one or more first frames of the first video content with one or more second frames of the second video content to generate the third video content for the third content stream, the first content stream having a first frequency and the second content stream having a second frequency;
   means for determining whether a third frequency of the third content stream does not satisfy a frequency capability of a presentation device;
   based on determining that the third frequency of the third content stream does not satisfy the frequency capability of the presentation device, means for adjusting the third frequency by adjusting at least one of the first frequency of the first content stream or the second frequency of the second content stream such that an adjusted third frequency of the third content stream satisfies the frequency capability of the presentation device;
   means for causing presentation of the third video content of the third content stream at the presentation device, wherein during the presentation of the generated third video content, the first video content is viewable to a first user using a first wearable device while the second video content is imperceptible to the first user using the first wearable device and the second video content is viewable to a second user using a second wearable device while the first video content is imperceptible to the second user using the second wearable device;

means for receiving a control signal from a device of a first user during the presentation of the third video content, the control signal indicating an action to be performed on the first video content; and means for modifying the third content stream to cause the action to be performed on the first video content without affecting the display of the second video content.

17. The system of claim 16, wherein the means for combining combines the first video content and the second video content by sequentially interleaving frames from the first video content and the second video content.

18. The system of claim 16, wherein the means for combining combines the first video content and the second video content by performing operations including:
    interleaving pixels of the first video content and pixels of the second video content;
    causing the pixels of the first video content to be polarized in a first direction; and
    causing the pixels of the second video content to be polarized in a second direction that is orthogonally different from the first direction.

19. The system of claim 16, further comprising means for detecting, from the control signal, an indication of at least one of an identification of the first video content or identification of the device that sent the control signal.

20. The system of claim 16, further comprising means for providing an application to the device, activation of the application causing the device to be specially configured to function as a remote control for controlling presentation of the first video content.

* * * * *